United States Patent [19]

Kanno et al.

[11] Patent Number: 4,903,147

[45] Date of Patent: Feb. 20, 1990

[54] METHOD AND APPARATUS FOR PROCESSING AN IMAGE

[75] Inventors: Yoshimitsu Kanno, Sagamihara; Teruo Fumoto; Hiroaki Kotera, both of Kawasaki, all of Japan

[73] Assignee: Matsushita Electric Industrial Co., Ltd., Japan

[21] Appl. No.: 216,165

[22] Filed: Jul. 7, 1988

[30] Foreign Application Priority Data

| Jul. 8, 1987 | [JP] | Japan | 62-170255 |
| Jul. 14, 1987 | [JP] | Japan | 62-175164 |
| Sep. 22, 1987 | [JP] | Japan | 62-237836 |
| Oct. 19, 1987 | [JP] | Japan | 62-263426 |

[51] Int. Cl.$^4$ .............................................. H04N 1/40
[52] U.S. Cl. ................................. 358/448; 358/451; 358/455
[58] Field of Search ............... 358/283, 287, 448, 455, 358/460, 471, 451

[56] References Cited

U.S. PATENT DOCUMENTS

| 4,381,547 | 4/1983 | Ejiri | 358/280 |
| 4,394,693 | 7/1983 | Shirley | 358/455 |
| 4,456,924 | 6/1984 | Rosenfeld | 358/78 |
| 4,486,788 | 12/1984 | Yamada | 358/283 |
| 4,547,811 | 10/1985 | Ochi | 358/280 |
| 4,547,814 | 10/1985 | Hirosawa | 358/298 |
| 4,651,225 | 3/1987 | Yamada | 358/287 |
| 4,672,464 | 6/1987 | Shida | 358/287 |
| 4,680,720 | 7/1987 | Yoshii | 358/283 |
| 4,692,879 | 9/1987 | Ikuta | 358/283 |
| 4,724,544 | 2/1988 | Matsumoto | 382/27 |
| 4,758,897 | 7/1988 | Hiratsuka | 358/283 |
| 4,780,768 | 10/1988 | Tomohisa | 358/283 |

Primary Examiner—Edward L. Coles, Sr.
Assistant Examiner—Jerome Grant
Attorney, Agent, or Firm—Lowe, Price, LeBlanc, Becker & Shur

[57] ABSTRACT

In a method and an apparatus for processing an image, a small screen dot pattern is prepared. A large screen dot pattern is generated by copying or repeatedly reading out the small screen dot pattern. Data of a variable tone image are processed with the large screen dot pattern and are thereby converted into processed image data representative of a screen dot image. The screen dot image may be recorded in a suitable way.

9 Claims, 18 Drawing Sheets

| 17 | 33 | 45 | 44 | 36 | 28 | 21 | 37 | 46 |
|----|----|----|----|----|----|----|----|----|
| 29 | 41 | 49 | 52 | 48 | 39 | 23 | 26 | 34 |
| 37 | 46 | 50 | 51 | 43 | 31 | 15 | 10 | 18 |
| 26 | 34 | 42 | 47 | 35 | 19 | 6  | 1  | 5  |
| 10 | 18 | 30 | 38 | 27 | 11 | 2  | 0  | 4  |
| 1  | 5  | 14 | 22 | 24 | 16 | 7  | 3  | 8  |
| 0  | 4  | 9  | 25 | 40 | 32 | 20 | 12 | 13 |

7 DOTS (Y) × 9 DOTS (X)

FIG. 12
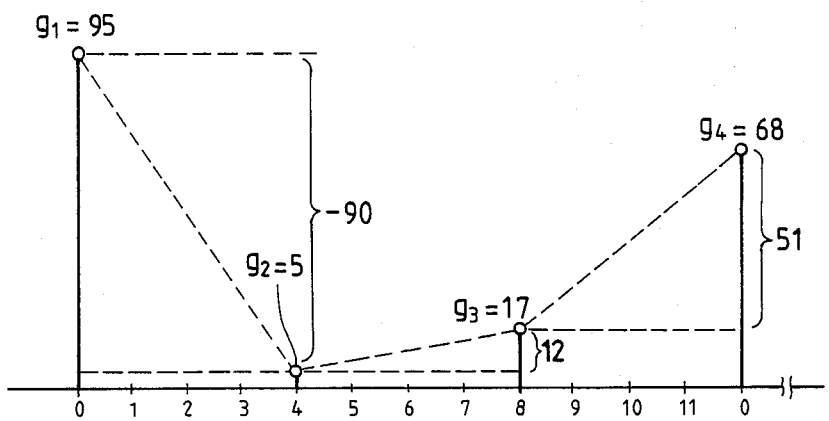
FIG. 13
| i | 0 | 1 | 2 | 3 | 0 | 1 | 2 | 3 | 0 | 1 | 2 | 3 |
|---|---|---|---|---|---|---|---|---|---|---|---|---|
| D | 0 | -23 | -45 | -68 | 0 | 3 | 6 | 9 | 0 | 13 | 26 | 38 |
FIG. 14
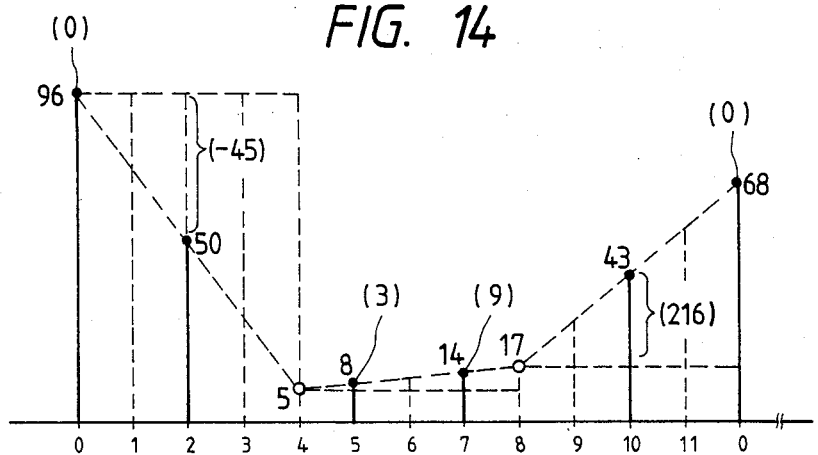

(a)

(b)

METHOD AND APPARATUS FOR PROCESSING AN IMAGE

BACKGROUND OF THE INVENTION

This invention relates to method and apparatus for processing signals of images such as variable tone images or halftone images.

Dither is a technique for representing the entire gray scale of a picture by picture elements with only two levels, that is, white and black. The level of gray generally depends on the number of white or black dots within a unit small area. Some types of the dither technique use screen dot patterns. Computers are frequently employed in performing such types of the dither technique.

SUMMARY OF THE INVENTION

It is an object of this invention to provide simple method and apparatus for processing an image.

A first image processing apparatus of this invention includes a first memory holding a screen dot pattern generated in accordance with a prescribed screen cord number and a prescribed screen dot angle. A recurrent screen dot pattern is generated on the basis of the screen dot pattern held by the first memory. The recurrent screen dot pattern resides in an area of a prescribed size. A second memory holds the recurrent screen dot pattern. A first address generator generates an address for data write into and data readout from the second memory. A line buffer circuit temporarily holds data of an input variable tone image. A second address generator generates an address for data write into and data readout from the line buffer circuit. A comparator compares image data and screen dot pattern data, the image data being outputted from the line buffer circuit, the screen dot pattern data being outputted from the second memory.

In a first method of processing an image according to this invention, variable tone image data are sequentially inputted. Threshold data are determined in correspondence with a sequence of input of the image data. The threshold data are in a two dimensional arrangement. The image data and the threshold data are compared so that the image data are converted into binary screen dot data. A recording device is controlled in accordance with the screen dot data. The threshold data are formed from a plurality of screen dot patterns arranged in series having a gradient equal to an integer "b" divided by an integer "a". A threshold block is copied at positions spaced at vertical intervals corresponding to "b" dots and at horizontal intervals corresponding to "a" dots, so that an array of the same threshold blocks is formed. The threshold block includes at least one period of the screen dot pattern. A part is extracted from the array of the threshold blocks, the part residing in a square area having sides corresponding to $(a^2+b^2)$ multiplied by an integer. This part is periodically and repeatedly read out in a vertical direction and a horizontal direction, so that a large screen dot pattern is formed. The large screen dot pattern is used as the threshold data in the comparing step.

A second image processing apparatus of this invention includes a first memory holding data of a threshold block. The threshold block is repeatedly read out, thereby forming a screen dot pattern having a gradient equal to an integer "b" divided by an integer "a". A second memory holds the screen dot pattern. A third memory inputs data from the second memory and holds a table for conversion of levels of the screen dot pattern data. Reference data are derived from the data inputted into the third memory by referring to the data conversion table. A comparator compares variable tone image data and the reference data.

A third image processing apparatus of this invention includes a first memory holding a screen dot pattern which is determined in accordance with a prescribed gradient equal to an integer "b" divided by an integer "a". The screen dot pattern resides in a square area with sides having a size equal to $(a^2+b^2)$ multiplied by an integer. A second memory inputs data from the first memory and holds a table for conversion of levels of the screen dot pattern data. Reference data are derived from the data inputted into the second memory by referring to the data conversion table. A comparator compares variable tone image data and the reference data.

A fourth image processing apparatus of this invention includes a memory holding at least part of information of an original image where a sampling point density is lower than an output dot density. The original image has a variable tone. Interpolation picture element values at points between adjacent sampling points of the original image are calculated so that an interpolated image is derived from the original image. Values of respective picture elements of the interpolated image are processed with threshold values so that the picture element values are converted into binary values of dots corresponding to a screen dot image composed of dots.

A second method of processing an image according to this invention is used for change of a size of an image wherein new data are added between original picture element data through an interpolation process to change a size of the original image by a factor of B/α where the characters B and α denote integers. In the second method, an interval between adjacent picture elements of an original image is equally divided into portions whose number equal to an integer G. Points are set which correspond to the respective divided interval portions. Interpolation data at the points are determined which vary as a function of the adjacent picture elements of the original image. Part of the interpolation data is selected at a rate equal to B/(α·G).

A fifth image processing apparatus of this invention includes a subtracter calculating a difference between data of adjacent picture elements of a variable tone image. A first memory holds addresses depending on a prescribed division number and being for readout of interpolation data. A second memory holds the interpolation data which are determined in accordance with the addresses from the first memory. An adder adds data of a picture element of the original image and the interpolation data read out from the second memory.

BRIEF DESCRIPTION OF THE DRAWINGS

FIG. 12 is a diagram of an original input image data in an image processing apparatus according to a fifth embodiment of this invention.

FIG. 13 is a diagram of the relationship between division position i and interpolation increment data in the apparatus of the fifth embodiment of this invention.

FIG. 14 is a diagram of image data obtained through an interpolation process in the apparatus of the fifth embodiment of this invention.

DESCRIPTION OF THE FIRST PREFERRED EMBODIMENT

Figure 1:
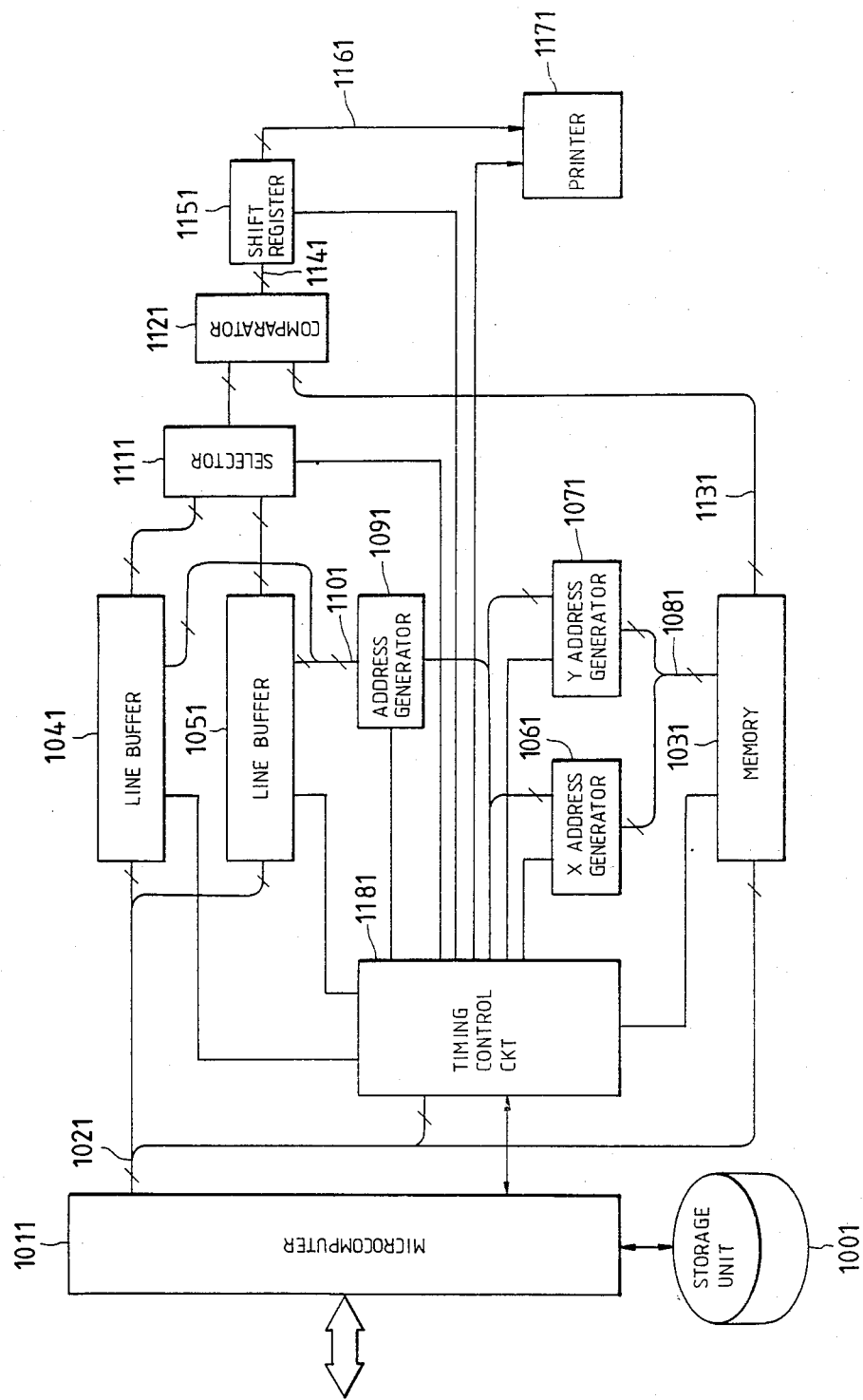
FIG. 1 is a block diagram of an image processing apparatus according to a first embodiment of this invention.

With reference to FIG. 1, an image processing apparatus includes a storage unit 1001 which holds data representative of a predetermined recurrent screen dot pattern corresponding to a screen line number or screen cord number l, a screen dot angle $\theta$, and a recording density k of a recording device. Data representative of the portion of the recurrent screen dot pattern in a square area of a size corresponding to the square of a screen dot pitch d are transferred from the storage unit 1001 to a memory 1031 by a microcomputer 1011. This data transfer is performed along data lines 1021 connecting the microcomputer 1011 and the memory 1031.

Input variable tone image data or input gray scale image data corresponding to one line are written by the microcomputer 1011 into a line buffer memory 1041 or 1051. This data write is performed by using data lines 1021 connecting the microcomputer 1011 and the line buffer memories 1041 and 1051. Each time image data corresponding to one line are inputted, the data writes into the line buffer memories 1041 and 1051 are changed.

A combination of an X address generator 1061 and a Y address generator 1071 outputs an XY address signal 1081 to the memory 1031. One set of data corresponding to a picture element or a unit portion of the screen dot pattern is read out from the memory 1031 in response to the XY address signal. The screen dot pattern data read out from the memory 1031 are transferred to a comparator 1121 via a line 1131. At the same time, one set of data corresponding to a picture element or a unit portion of the input image are read out from each of the line buffer memories 1041 and 1051 in response to an address signal 1101 supplied to the line buffer memories 1041 and 1051 from an address generator 1091. A selector 1111 accepts the image data read out from one of the line buffer memories 1041 and 1051 free from the data write process and rejects the image data read out from the other line buffer memory subjected to the data write process. Accordingly, the two line buffer memories 1041 and 1051 are changed cyclically such that one is subjected to an effective data read process and the other is subjected to a data write process during a first period, and that one is subjected to a data write process and the other is subjected to an effective data read process during a second period. The selector 1111 passes the accepted image data to the comparator 1121.

The devices 1121 compares the levels represented by the image data and the screen dot pattern data, and generates screen dot image data 1141 representative of the result of the level comparison. It is preferable that, in the comparator 1121, data corresponding to the comparison result are read out from a read-only memory in accordance with an address determined by a combination of the compared data values. The screen dot image data 1141 are in a bit serial form where one bit corresponds to one dot. The screened dot image data 1141 are inputted into a shift register 1151 and are packed into 8-bit parallel data 1161 fed to a recording device or a laser beam printer 1171. The laser beam printer 1171 derives a screen dot image from the screen dot image data 1161.

A timing control circuit 1181 outputs clocks and timing control signals to the devices 1011, 1031, 1041, 1051, 1061, 1071, 1091, 1111, 1151, and 1171.

Figure 2:
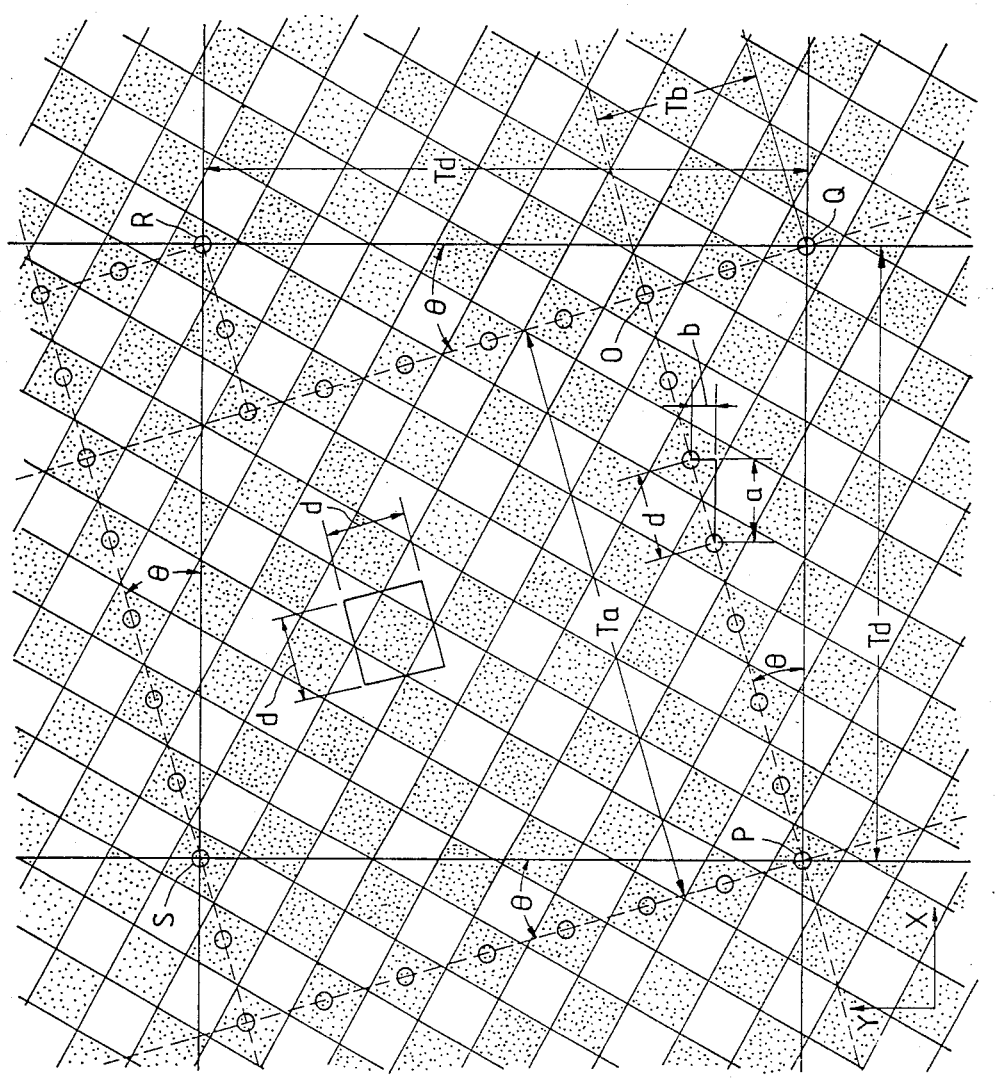
FIG. 2 is a diagram of a screen dot pattern generated in the apparatus of FIG. 1.

The size of the recurrent screen dot pattern stored in the memory 1031 is determined as follows. With reference to FIG. 2 showing the case of a screen dot area percentage of 50%, small dark squares correspond to black areas of screen dots and small white squares correspond to white areas of screen dots. The gradient of a series of black dots is called a screen dot angle equal to an integer "b" divided by an integer "a". The point O is defined as being distant from the center P of a given screen dot by an interval corresponding to the integer "a" along the series of the screen dots. As understood from FIG. 2, the point O coincides with the center of a screen dot. The point Q is defined as being distant from the point O by an interval corresponding to the integer "b" along another series of screen dots extending perpendicular to the line OP. As understood from FIG. 2, the point Q also coincides with the center of a screen dot. Accordingly, it can be thought that the central point P of a screen dot appears again at the point Q distant from the original point P in the horizontal direction X, and that there are periodical or recurrent patterns with a period Td. Similarly, it can be seen that, in the vertical direction Y, there are periodical or recurrent patterns with a period Td equal to the period in the horizontal direction X. Accordingly, the four-cornered shape PQRS is a square with sides whose size equal to the value Td. The value Td is given as:

$$Td = \sqrt{Ta^2 + Tb^2} = a^2 + b^2 \quad (1)$$

The angle <OPQ equals a screen dot angle $\theta$ which corresponds to the screen dot gradient b/a and which is given as:

$$\theta = \tan^{-1}(b/a) \quad (2)$$

The euclidean distance d determined by the dot gradient b/a is given as:

$$d = \sqrt{a^2 + b^2} \quad (3)$$

The following equation (4) is derived from the equations (1) and (3).

$$Td = d^2 \quad (4)$$

The screen cord number l has a relationship with the dot recording density k of the recording device and the screen dot pitch d as expressed in the following equation.

$$l = k/d \quad (5)$$

The period of the screen dot pattern is thus uniquely determined by the equations (1) and (2) regardless of the screen dot angle and the screen cord number. Accordingly, a large screen dot pattern of an arbitrary size can be generated by repeating or copying the small recurrent screen dot pattern in the horizontal direction and the vertical direction.

Tables 1A and 1B show the calculated relationship among the integers "a" and "b", the dot gradient $\theta$, the screen dot pitch, and the period or the length of one side of the recurrent square area under conditions where a recording device, that is , the laser beam printer 1171 has a recording density k of 400 dot/inch and where the screen cords having a number equal to 50-140 line/inch are generated. As understood from Tables 1A and 1B, the length of one side of the square area for the recurrence of a screen dot pattern is equal to or smaller than 64 in unit of dot number. Accordingly, when the memory 1031 holds data corresponding to these screen dot patterns, a large screen dot pattern having a size equal to 50-140 line/inch can be generated from the held screen dot pattern. In the case where the recording device has a recording density of 454.5 dot/inch, the size of the recurrent square area equals 82 in unit of dot number. In the case where the recording device has a recording density of 909 dot/inch, the size of the recurrent square area equals 328 in unit of dot number.

TABLE 1A

| a [dot] | b [dot] | $\theta$ [°] | pitch [dot] | Line No. [line/inch] | period [dot] |
|---|---|---|---|---|---|
| 3 | 0 | 0.00 | 3.00 | 133.33 | 9 |
| 4 | 0 | 0.00 | 4.00 | 100.00 | 16 |
| 5 | 0 | 0.00 | 5.00 | 80.00 | 25 |
| 6 | 0 | 0.00 | 6.00 | 66.67 | 36 |
| 7 | 0 | 0.00 | 7.00 | 57.14 | 49 |
| 8 | 0 | 0.00 | 8.00 | 50.00 | 64 |
| 3 | 1 | 18.43 | 3.16 | 126.49 | 10 |
| 4 | 1 | 14.04 | 4.12 | 97.01 | 17 |
| 5 | 1 | 11.31 | 5.10 | 78.45 | 26 |
| 6 | 1 | 9.46 | 6.08 | 65.76 | 37 |
| 7 | 1 | 8.13 | 7.07 | 56.57 | 50 |
| 3 | 2 | 33.69 | 3.61 | 110.94 | 13 |
| 4 | 2 | 26.57 | 4.47 | 89.44 | 20 |
| 5 | 2 | 21.80 | 5.39 | 74.28 | 29 |
| 6 | 2 | 18.43 | 6.32 | 63.25 | 40 |
| 7 | 2 | 15.95 | 7.28 | 54.94 | 53 |
| 1 | 3 | 71.57 | 3.16 | 126.49 | 10 |
| 2 | 3 | 56.31 | 3.61 | 110.94 | 13 |
| 3 | 3 | 45.00 | 4.24 | 94.28 | 18 |
| 4 | 3 | 36.87 | 5.00 | 80.00 | 25 |
| 5 | 3 | 30.96 | 5.83 | 68.60 | 34 |

TABLE 1B

| a [dot] | b [dot] | $\theta$ [°] | pitch [dot] | Line No. [line/inch] | period [dot] |
|---|---|---|---|---|---|
| 6 | 3 | 26.57 | 6.71 | 59.63 | 45 |
| 7 | 3 | 23.20 | 7.62 | 52.52 | 58 |
| 1 | 4 | 75.96 | 4.12 | 97.01 | 17 |
| 2 | 4 | 63.43 | 4.47 | 89.44 | 20 |
| 3 | 4 | 53.13 | 5.00 | 80.00 | 25 |
| 4 | 4 | 45.00 | 5.66 | 70.71 | 32 |
| 5 | 4 | 38.66 | 6.40 | 62.47 | 41 |
| 6 | 4 | 33.69 | 7.21 | 55.47 | 52 |
| 1 | 5 | 78.69 | 5.10 | 78.45 | 26 |
| 2 | 5 | 68.20 | 5.39 | 74.28 | 29 |
| 3 | 5 | 59.04 | 5.83 | 68.60 | 34 |
| 4 | 5 | 51.34 | 6.40 | 62.47 | 41 |
| 5 | 5 | 45.00 | 7.07 | 56.57 | 50 |
| 6 | 5 | 39.81 | 7.81 | 51.21 | 61 |
| 1 | 6 | 80.54 | 6.08 | 65.76 | 37 |
| 2 | 6 | 71.57 | 6.32 | 63.25 | 40 |
| 3 | 6 | 63.43 | 6.71 | 59.63 | 45 |
| 4 | 6 | 56.31 | 7.21 | 55.47 | 52 |
| 5 | 6 | 50.19 | 7.81 | 51.21 | 61 |
| 1 | 7 | 81.87 | 7.07 | 56.57 | 50 |
| 2 | 7 | 74.05 | 7.28 | 54.94 | 53 |
| 3 | 7 | 66.80 | 7.62 | 52.52 | 58 |

In Tables 1A and 1B, for example, the screen dot pattern determined by the integers "a" and "b" equal to 7 and 2 respectively has the screen dot angle $\theta = 15.95$ degrees, the screen dot pitch equal to 7.28 dots, the screen cord number 54.94 line/inch, and the size of one side of the square area for the recurrence of the screen dot pattern which equals 53 dots. When the maximal size of the screen dot pattern is equal to 64 dots for the recording density of 400 dot/inch and the screen cord number 50-140 line/inch as described previously, and when the tone is represented by 256 different scales of gray, the capacity of the memory 1031 can be $64^2$ bytes, that is, 4096 bytes. Under similar conditions, the capacity of the memory 1031 can be 6724 bytes and 107,584 bytes for the recording densities of 454.5 and 909 dot/inch respectively. In the case where the recording device has a recording density of 909 dot/inch and the maximal record size corresponds to "A3", that is, $16.5 \times 11.7$ inch$^2$, all the screen dot pattern corresponds to a capacity of about 152 MB. Thus, the capacity of the memory 1031 can be approximately a tenth of the capacity corresponding to all the screen dot pattern.

As described previously, a screen dot pattern is produced in accordance with a prescribed screen cord number l, a prescribed screen dot angle $\theta$, and a prescribed recording density k of a recording device. A small screen dot pattern in a square area is extracted from the produced screen dot pattern, the small square screen dot pattern having a size corresponding to a uniquely determined recurrence period. The extracted small square screen dot pattern is written into the memory 1031. A large screen dot pattern is generated by repeatedly and periodically reading out the small square pattern from the memory 1031. This process allows the capacity of the memory 1031 to be small.

DESCRIPTION OF THE SECOND PREFERRED EMBODIMENT

Figure 3:
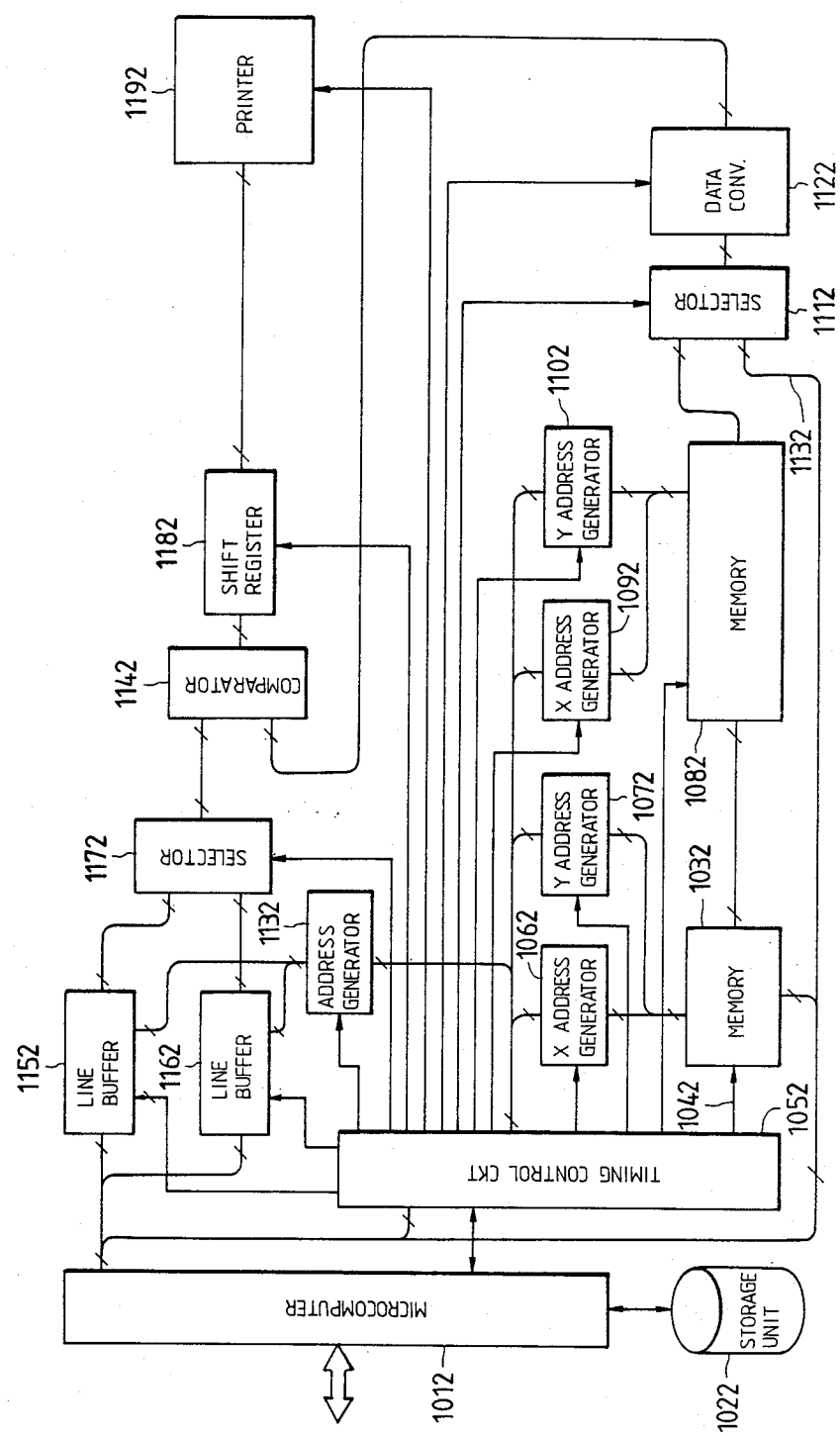
FIG. 3 is a block diagram of an image processing apparatus according to a second embodiment of this invention.

As shown in FIG. 3, an image processing apparatus according to a second embodiment of this invention includes a microcomputer 1012 which reads out a block of threshold data from a storage unit 1022 and which transfers the threshold data block to a memory 1032 by use of a data write signal 1042. The transferred threshold data are determined in correspondence with a prescribed dot recording density of a recording device, a prescribed screen cord number, and a prescribed screen dot angle. The data write signal 1042 is generated by a timing control circuit 1052. X and Y addresses determined by an X address generator 1062 and a Y address generator 1072 are used in writing the threshold data block into the memory 1032. The threshold data block is repeatedly read out from the memory 1032 and is transferred to a memory 1082. Addresses determined by the X address generator 1062 and the Y address generator 1072 are used in reading out the threshold data block from the memory 1032. Addresses determined by an X address generator 1092 and a Y address generator 1102 are used in writing the threshold data block into the memory 1082.

In the X address generator 1092, an integer "a" in a dot gradient b/a representative of the prescribed screen dot angle is used as address data corresponding to an increment in movement along the X direction, and an address determined by (m·a+i) is generated where the characters m and i denote integers and the integer i represents a relative address with respect to a reference point within the threshold data block. In the Y address generator 1102, an integer "b" in a dot gradient b/a is used as an address data corresponding to an increment in movement in the Y direction, and an address determined by (n·b+j) where the characters n and j denote integers and the integer j represents a relative address with respect to a reference point within the threshold data block. In this way, a screen dot pattern is repeated, forming a recurrent screen dot pattern in the memory 1082. The previously-mentioned processes are executed during an initialization.

The timing control circuit 1052 sets a screen dot pattern period $(a^2+b^2)$ in the X address generator 1092 and the Y address generator 1102. Accordingly, a recurrent screen dot pattern in a square area having a side size equal to $(a^2+b^2)$ is repeatedly read out from the memory 1082, thereby generating a large screen dot pattern of an arbitrary size which is transferred to a data conversion table memory 1122 via a data selector 1112. This memory 1122 converts the input data into corresponding other data and holds the latter data. The microcomputer 1012 pretransmits the conversion data to the memory 1122 via data setting lines 1132 and the data selector 1112. The converted screen dot pattern data are inputted into a comparator 1142.

The microcomputer 1012 selectively writes gray scale image data into one of line buffer memories 1152 and 1162. During this data write, the previously-written gray scale image data are read out from the other line buffer memory and are transferred to the comparator 1142 via a selector 1172. The data write and data read into and from the line buffer memories 1152 and 1162 are controlled in accordance with addresses generated by an address generator 1132. The device 1142 compares the levels represented by the gray scale image data and the screen dot data, outputting a signal of a bit serial form representing the comparison results. A shift register 1182 convertes the bit serial data into corresponding parallel data, which are fed to a recording device or a laser beam printer 1192. The laser beam printer 1192 derives a screen image from the input parallel data and records the screen image.

The timing control circuit 1052 supplies clocks and timing control signals to the devices 1012, 1032, 1062, 1072, 1082, 1092, 1102, 1112, 1122, 1132, 1152, 1162, 1172, 1182, and 1192.

The size of the recurrent screen dot pattern is determined as in the previous description related to FIG. 2.

Figure 4:
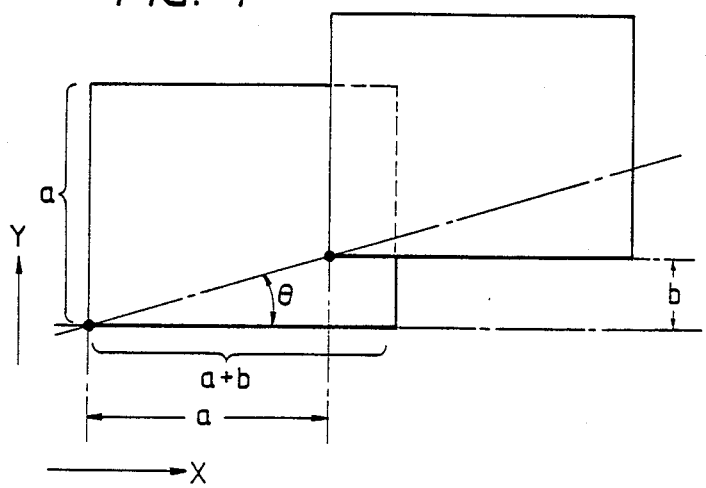
FIGS. 4 and 5 are diagrams of threshold blocks generated in the apparatus of FIG. 3.
Figure 5:
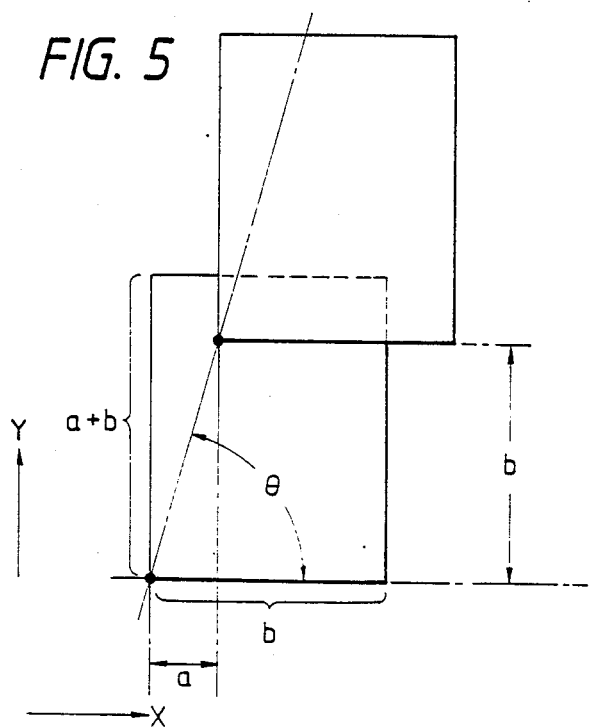

The generation of the recurrent screen dot pattern will be described in more detail hereinafter. FIG. 4 shows a rectangular threshold data block and its copy in the case where b<a. The threshold block of FIG. 4 has a vertical size equal to "a" dots and a horizontal size equal to (a+b) dots. FIG. 5 shows a rectangular threshold data block and its copy in the case where b>a. The threshold block of FIG. 5 has a vertical size equal to (a+b) dots and a horizontal size equal to "b" dots. As shown in FIGS. 4 and 5, the original threshold block is translated by "a" dots in the horizontal direction X and by "b" dots in the vertical direction Y, forming a copy of the original threshold data block at a screen dot angle $\theta$ equal to $\tan^{-1} b/a$. Such a copy process is reiterated.

Figures 6, 7:
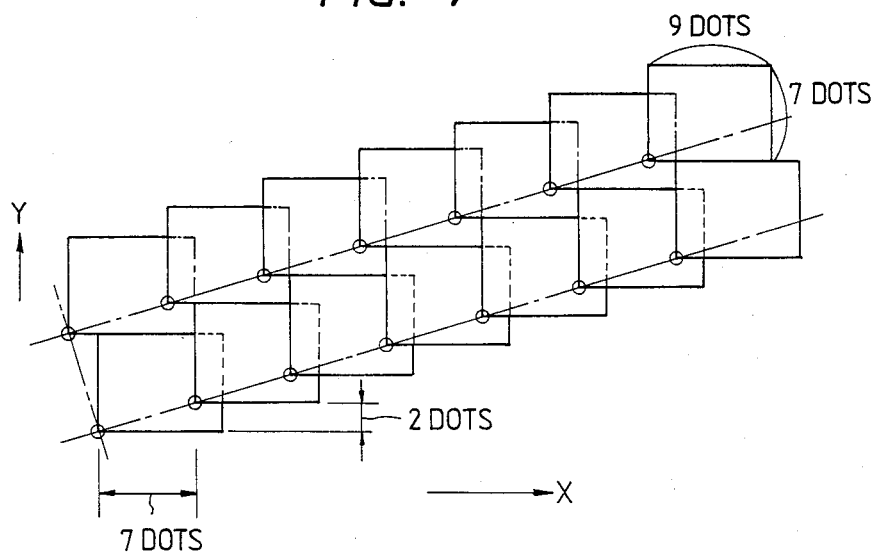
FIG. 6 is a diagram of an internal structure of a threshold block generated in the apparatus of FIG. 3.
FIG. 7 is a diagram of series of threshold blocks generated in the apparatus of FIG. 3.
Figure 8:
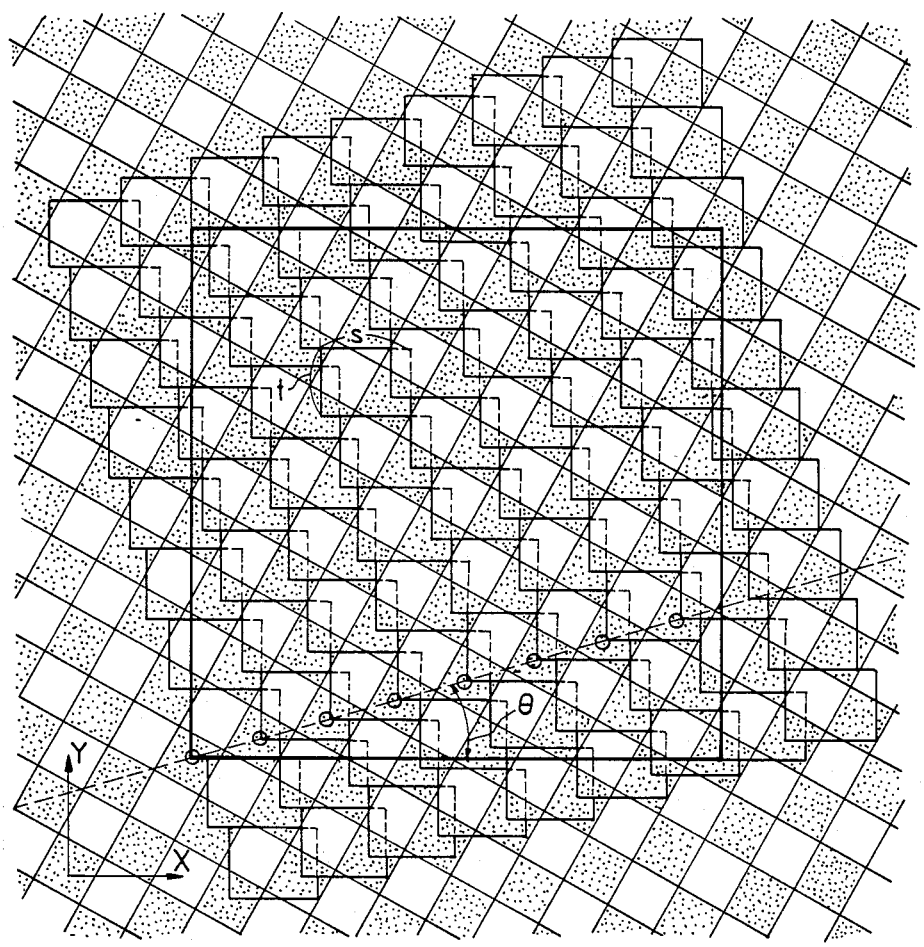
FIG. 8 is a diagram of an array of threshold blocks generated in the apparatus of FIG. 3.

FIG. 6 shows one example of a threshold data block which has a vertical size equal to 7 dots and a horizontal size equal to 9 dots. Such a threshold block is stored in the memory 1032 of FIG. 3. In the threshold block of FIG. 6, threshold values are distributed in a spiral depending on a screen dot angle. As shown in FIG. 7, the original threshold blocks of FIG. 6 are translated by 7 dots in the horizontal direction X and by 2 dots in the vertical direction Y, forming copies of the original threshold blocks at a screen dot angle b/a equal to 2/7. Such copy processes are reiterated so that an array of the same threshold blocks is produced. FIG. 8 shows a large array of the threshold blocks of FIG. 6. In FIG. 8, the square area defined by the thick lines has sides Td equal to 53 $(7^2+2^2)$ dots and corresponds to a recurrent screen dot pattern. Such a recurrent screen dot pattern is generated in the memory 1082 of FIG. 3.

DESCRIPTION OF THE THIRD PREFERRED EMBODIMENT

Figure 9:
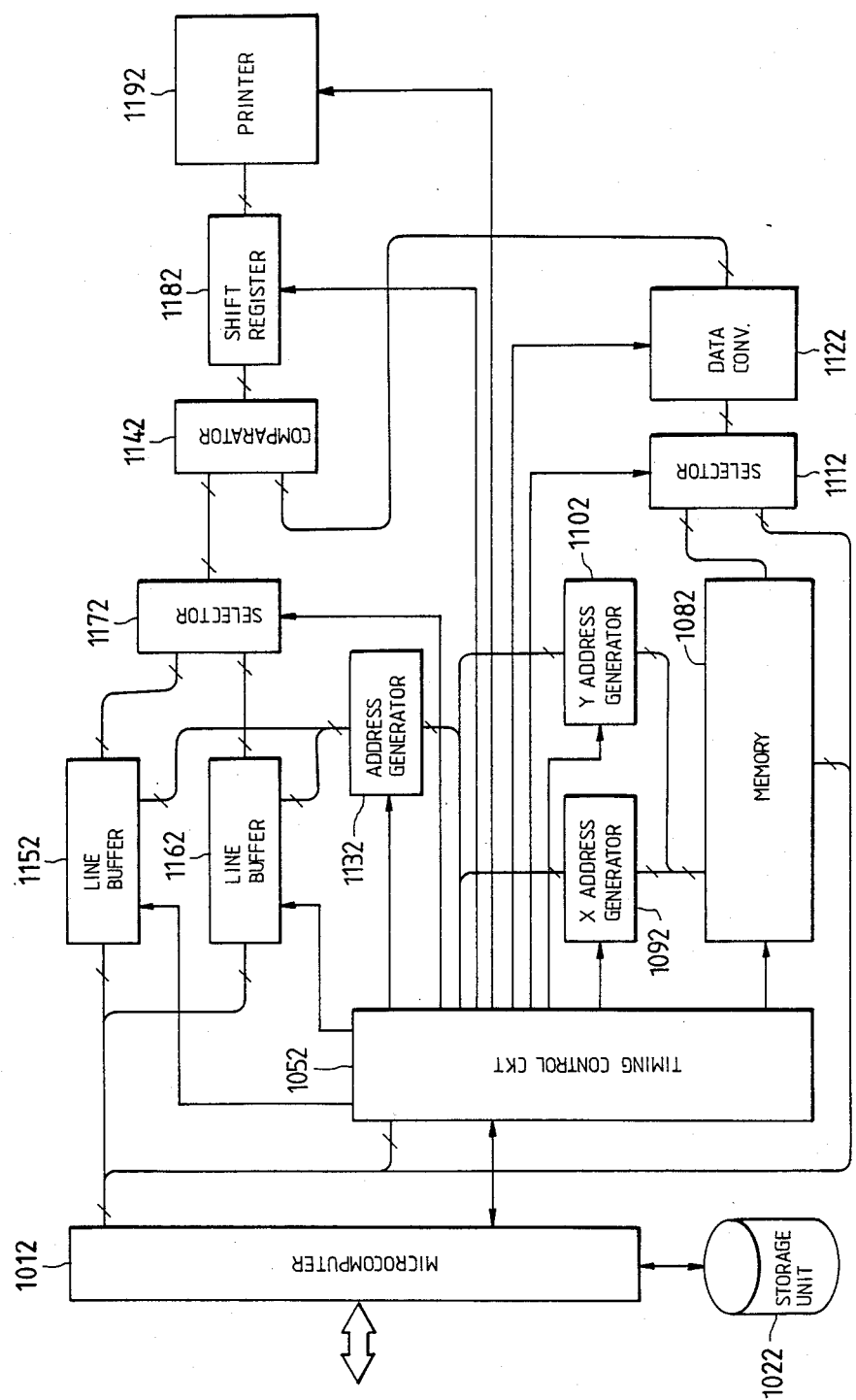
FIG. 9 is a block diagram of an image processing apparatus according to a third embodiment of this invention.

FIG. 9 shows a third embodiment of this invention which is similar to the embodiment of FIGS. 3-8 except for the following design changes.

The memory 1032 and the address generators 1062 and 1072 (see FIG. 3) are omitted from the embodiment of FIG. 9. The memory 1082 is directly connected to the microcomputer 1012. Data corresponding to a recurrent screen dot pattern and depending on a screen dot angle, a screen cord number, and a dot recording density of a recording device are read out from the storage unit 1022 and are then transferred to the memory 1082 by the microcomputer 1012.

DESCRIPTION OF THE FOURTH PREFERRED EMBODIMENT

Figure 10:
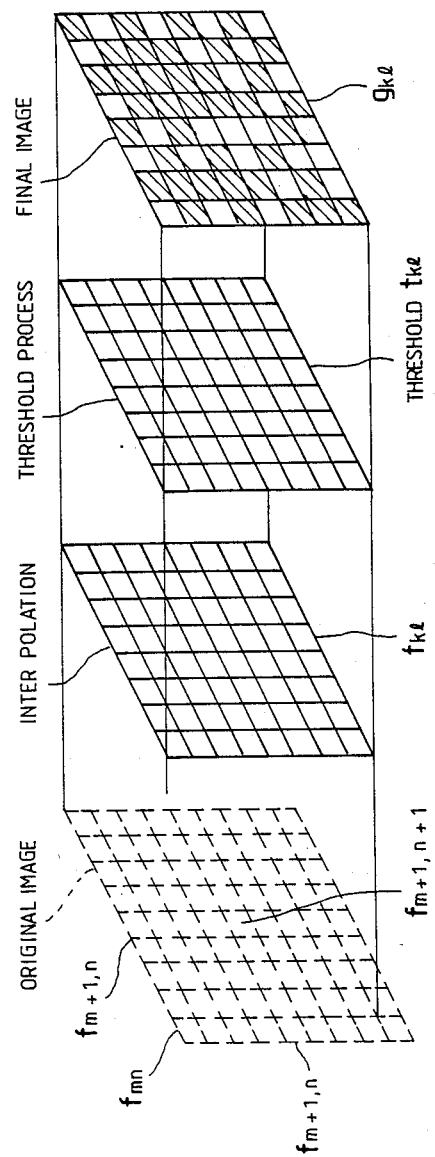
FIG. 10 is a diagram of various image data in an image processing apparatus according to a fourth embodiment of this invention.

With reference to FIG. 10, in an image processing apparatus according to a fourth embodiment of this invention, an original image fmn has a low resolving power corresponding to 4.7 line/mm. A final screen dot image gkl derived from the original image is formed by dots having a high density of 35.8 line/mm. The ratio of the dot density of the final image to the dot density of the original image is 7.614. An interpolation image fkl is generated from the original image fmn. During the generation of the interpolation image fkl, boundaries between adjacent picture elements of the original image fmn are compensated by interpolation in such a manner that the density of the interpolation image fkl can be equal to the density of the final image gkl. Specifically, during the generation of the interpolation image fkl from the original image fmn, intermediate picture elements whose number equal to $N^2$ are calculated from adjacent four picture elements fmn, fm+1,n, fm,n+1, fm+1,n+1 of the orininal image in interpolation. The character N denotes an integer closest to a target dot density. The picture element values of the respective lattice points of the interpolation image fkl are obtained by weighting the picture element values of the original image in accordance with the vertical and horizontal distances from the lattice points of the original image. The interpolation image is digitalized with a threshold matrix tmn and is thereby converted into the high dot density final image gkl.

Figure 11:
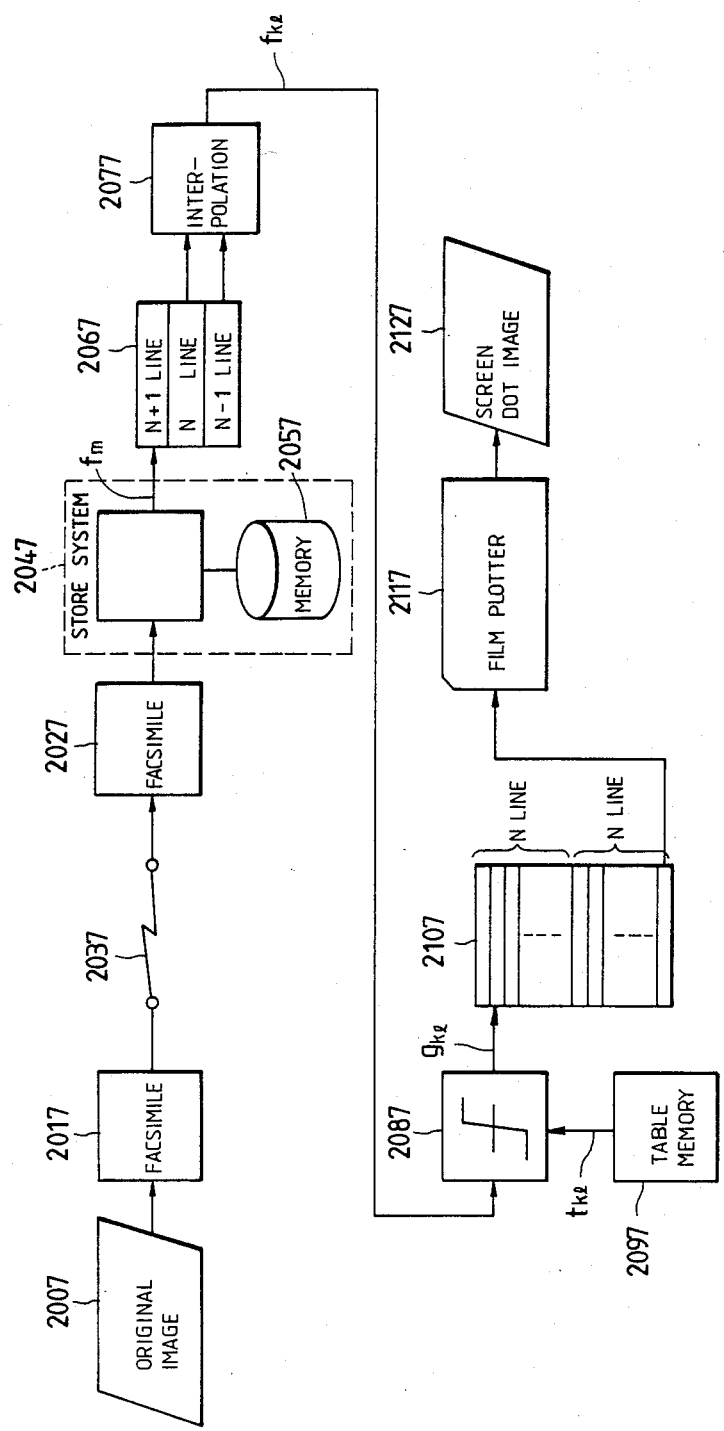
FIG. 11 is a block diagram of the image processing apparatus of the fourth embodiment of this invention.

As shown in FIG. 11, an original image 2007 is transmitted from a facsimile transmitter 2017 to a facsimile receiver 2027 via a line 2037. An image store system 2047 stores the received original image into an internal memory 2057. Data corresponding to three lines of the original image are sequentially transferred from the memory 2057 to an image memory 2067. An interpolation calculation circuit 2077 is supplied with tow lines of data from the memory 2067. This circuit 2077 calculates an $N^2$-number of interpolation picture element values fkl from two adjacent picture elements of each line in a weighting process or a weighted average using the values of the four adjacent picture elements. While the interpolation calculation corresponding to one line of the original image is performed, new data of the original image are fed into one line of the memory 2067 in preparation for the subsequent interpolation calculation using the new and preceding lines. A threshold circuit 2087 compares the interpolation picture element values fkl with a threshold matrix tkl, converting the interpolation picture element values fkl into a binary dot signal gkl. The threshold matrix tkl is supplied from a table memory 2097 to the threshold circuit 2087. The binary dot signals gkl are sequentially stored into a memory 2107. The memory 2107 has a capacity corresponding to one bit multiplied by 2N lines, holding two sets of the dot data gkl in the vertical direction which were derived via the interpolation process with the multiplication of one line of the original image by N lines. The memory 2107 holds the dot data gkl in the horizontal direction which were derived via the interpolation process with the multiplication of the original image by N lines. Each time one line of the original image is processed, N lines of dot data are written into the memory 2107 and the current N lines of dot data and the preceding N lines of dot data are outputted from the memory 2107 to a film plotter 2117. The film plotter 2117 generates a screen dot image 2127 in accordance with the input dot data.

Since the interpolation circuit 2077 precedes the threshold circuit 2087 along the flow of a data signal, the data of the original image of the low resolving power can be converted in real time into the screen dot image of the high resolving power. In the case of a screening process of a digital image, an efficient dot conversion can be realized without increasing the quantity of image information.

DESCRIPTION OF THE FIFTH PREFERRED EMBODIMENT

FIG. 12 shows one example of an input image data fed to an image processing apparatus for image enlargement and reduction according to a fifth embodiment of this invention. The input image data of FIG. 12 has components $g_1$, $g_2$, $g_3$, and $g_4$ being equal to 95, 5, 17, and 68 respectively and corresponding to picture elements. In the case of a division number G equal to 4, as shown in FIG. 13, interpolation data D vary with a division position i=0,1,2,3. FIG. 14 shows an output image data which are derived from the input image data of FIG. 12 through a linear interpolation process.

Figure 15:
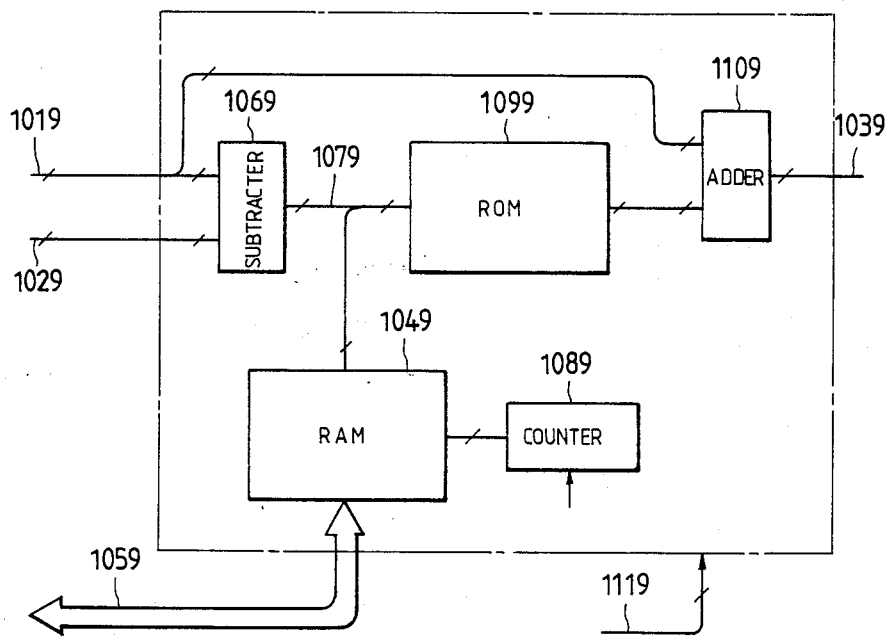
FIG. 15 is a block diagram of the image processing apparatus of the fifth embodiment of this invention.

As shown in FIG. 15, the image processing apparatus includes input lines 1019 and 1029, and an output line 1039. Picture elements $g_1$, $g_2$, and $g_3$ are sequentially inputted into the line 1019, and adjacent picture elements $g_2$, $g_3$, and $g_4$ are synchrously inputted into the line 1029. A processed image element data h are outputted via the line 1039. The output image data h are given as:

$$h = g_n + D \tag{11}$$

The character D denotes an integer defined as:

$$D = INT\{((g_{n+1} - g_n)/G) \cdot i\} \tag{12}$$

where the character INT{ } denotes an integer obtained through a rounding process. In the case where the image enlargement/reduction rate B/α is 5/3 and the picture element division number G is 4, the integer i denoting an address for the readout of interpolation data resides in a range as: $0 \leq i < G$. Accordingly, the integer i equals 0, 1, 2, or 3.

With respect to the picture elements $g_1$–$g_4$, the interpolation increment data corresponding to the address integers i are calculated from the equation (12) and are given as: 0, −23, −45, −68, 0, 3, 6, 9, 0, 13, 26, 38, 0, . . . .

An address i for the readout of the previously-mentioned interpolation increment data is preset by a suitable device such as a microcomputer in a random-access memory (RAM) 1049 through a data input line 1059. The readout address i is in the range of 0 to 3 as described previously and is specifically given as:

$$i = INT\{k \cdot (\alpha \cdot G)/B\} MDD(G) \tag{13}$$

where the character INT{ }MDD(G) denotes the remainder in the division "INT{ }/G", and the character k denotes an integer in the range of 0 to B−1. The integer k equals 0, 1, 2, 3, or 4. Accordingly, in this case, reiteration is performed with respect to the addresses i=0, 2, 1, 3, 2.

The picture element data $g_n$ and $g_{n+1}$ synchronously inputted into the respective lines 1019 and 1029 enter a subtracter 1069 calculating a difference $\Delta g = g_{n+1} - g_n$, the difference being in the range of $-255$ to $+255$. The calculated difference $\Delta g$ is outputted to a line 1079. A counter 1089 acts in synchronism with a timing of outputting of an interpolation picture element. The values i (i=0,2,1,3,2) are sequentially read out from the RAM 1049 in accordance with the output value of the counter 1089 and are outputted to the line 1079. The difference $\Delta g$ and the value i are combined to form a readout address applied to a read-only memory (ROM) 1099. The ROM 1099 holds interpolation increment data in locations determined by respective addresses. The interpolation increment data corresponding to 0, $-45$, 3, 9, and 26 are sequentially read out from the ROM 1099 in accordance with the value i=0, 2, 1, 3, and 2, being inputted into an adder 1109. The original picture element data $g_1$-$g_4$ are sequentially inputted into the adder 1109 via the line 1019 in synchronism with the inputting of the interpolation increment data into the adder 1109. The device 1109 adds the original picture element data and the interpolation increment data, forming an output processed image data which are outputted to the line 1039. The output image data have values as:

$$[95,95,5,5,17] + [0,-45,3,9,26] = [95,50,8,14,43] \quad (14)$$

Timing control signals are applied to the devices 1049, 1069, 1089, 1099, and 1109 via an input line 1119.

It should be noted that the RAM 1049 may be replaced by a ROM. In addition, the ROM 1099 may be replaced by a RAM.

Figure 16:
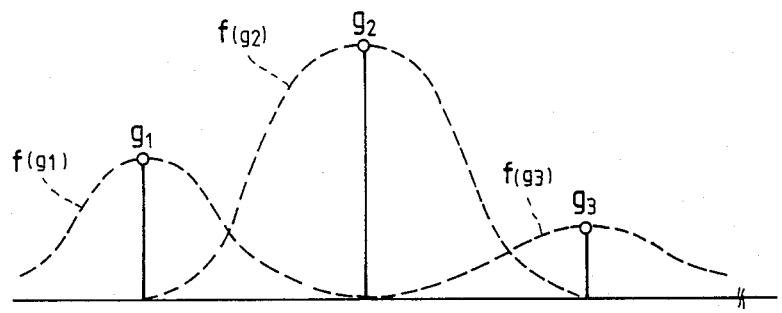
FIG. 16 is a diagram of image data and nonlinear tone distribution functions.
Figure 17:
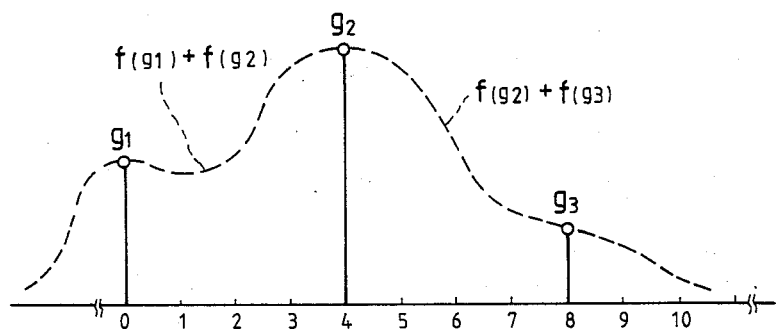
FIG. 17 is a diagram of image data and resultant nonlinear tone distribution functions.
Figure 18:
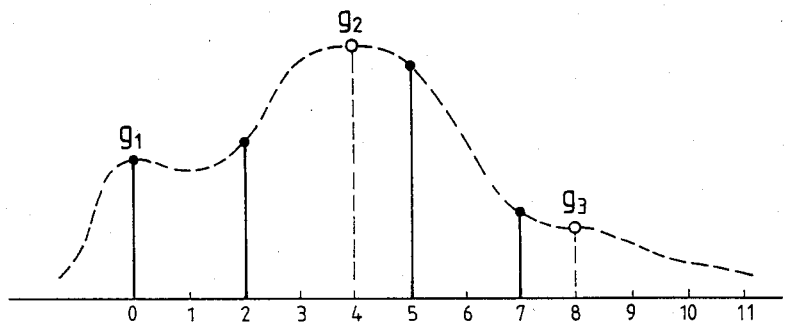
FIG. 18 is a diagram of image data obtained through a nonlinear interpolation process.

The linear interpolation may be replaced by nonlinear interpolation, which will be described hereinafter. As shown by the broken lines in FIG. 16, nonlinear tone distribution functions $f(g_1)$, $f(g_2)$, and $f(g_3)$ are determined in accordance with the picture element tone levels $g_1$, $g_2$, and $g_3$. Two adjacent distribution functions are added to form resultant tone distribution functions $f(g_1)+f(g_2)$ and $f(g_2)+f(g_3)$ which are shown by the broken lines in FIG. 17. As shown by thick lines in FIG. 18, data are newly added through the interpolation process using the resultant functions of FIG. 16. In this way, nonlinear interpolation is realized by setting interpolation increment data with arbitraty nonlinear functions.

DESCRIPTION OF THE SIXTH PREFERRED EMBODIMENT

Figure 19:
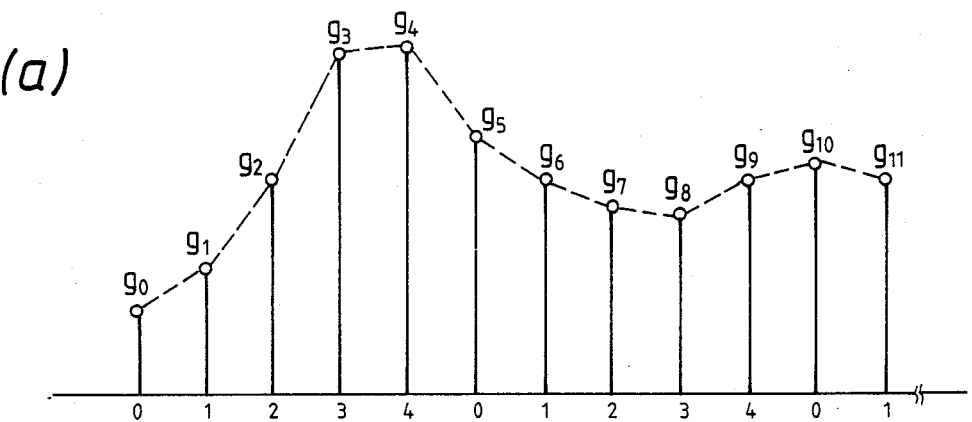
FIG. 19 is a diagram of original input image data and image data obtained, through an interpolation process in an image processing apparatus according to a sixth embodiment of this invention.
Figure 19:
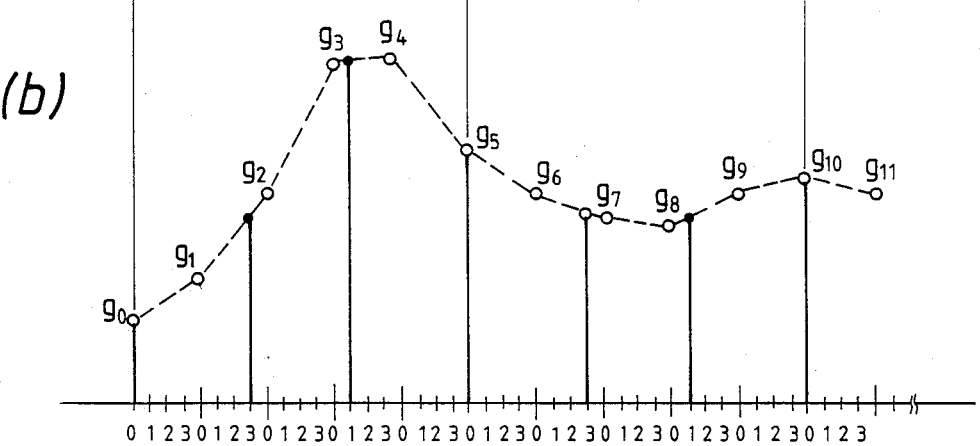

FIG. 19(a) shows one example of an input picture element data series fed to an image processing apparatus for image reduction according to a sixth embodiment of this invention. The input picture element data $g_0$-$g_{11}$ have varying levels of tone. The image processing apparatus processes the input image data with reduction interpolation and thereby derives processed image data as shown by thick lines in FIG. 19(b). In the case of FIG. 19(b), the rate of the image reduction is 3/5. As understood from FIG. 19(b), during the period between the occurrences of the input image data $g_2$ and $g_3$, no interpolation picture element data are generated. This function is realized by the following modification of the embodiment of FIGS. 12-15.

A selection latch is provided at a stage prior to the subtracter 1069 (see FIG. 15) or at a stage following the adder 1109 (see FIG. 15). Selection data (0, 1) written into the RAM 1049 (see FIG. 15) together with interpolation data readout addresses are used in controlling the selection latch.

Preset interpolation increment data are given by the previously-mentioned equations (11) and (12). An interpolation data readout address i is given by the previously-mentioned equation (13) and periodically assumes 0, 3, and 1 in the case of a division number G equal to 4. Selection data "0" represents an instruction that any interpolation picture element data should not be generated during the current original input picture element data and the subsequent original input picture element data. The selection data "1" represents an instruction that an interpolation picture element data should be generated. The selection data e are chosen to be 1, 1, 0, 1, 0, ... in correspondence with the input data $g_0$, $g_1$, $g_2$, $g_3$, $g_4$, .... Specifically, the interpolation data readout address i, the input image data $g_n$, and the selection data e are given as:

$g_n$: $g_0$, $g_1$, $g_2$, $g_3$, $g_4$
e: 1, 1, 0, 1, 0
i: 0, 3, X, 1, X where the character X denotes "arbitrary" and indicates nonrelation with the process.

DESCRIPTION OF THE SEVENTH PREFERRED EMBODIMENT

Figure 20:
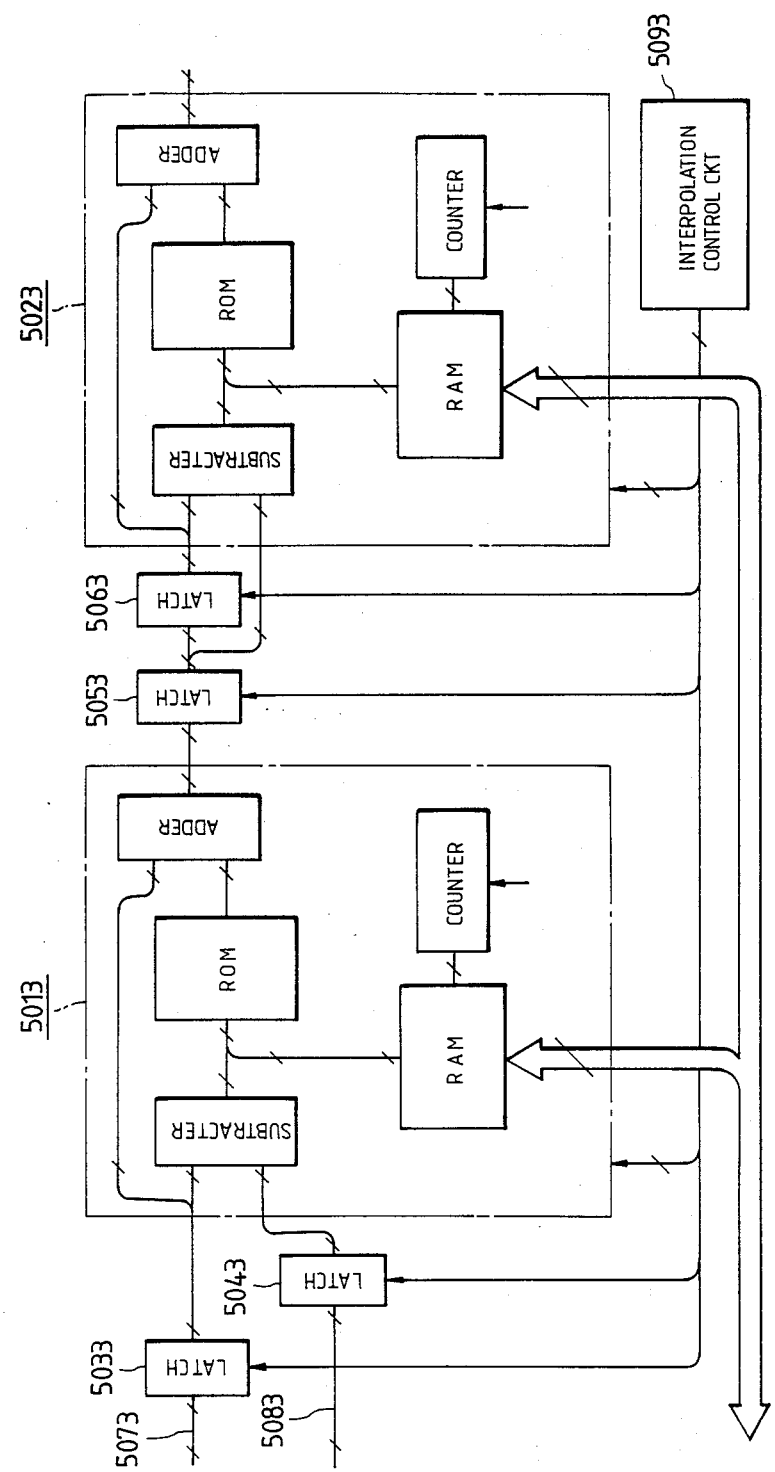
FIG. 20 is a block diagram of an image processing apparatus according to a seventh embodiment of this invention.

As shown in FIG. 20, an image processing apparatus according to a seventh embodiment of this invention includes interpolation sections 5013 and 5023 each corresponding to the circuit of FIG. 15. Latches 5033 and 5043 temporarily hold image data inputted into the interpolation section 5013. Latches 5053 and 5063 temporarily hold image data outputted from the interpolation section 5013 and inputted into the interpolation section 5023.

Input lines 5073 and 5083 are subjected to line data and adjancent line data respectively. The two line data are temporarily held by the latches 5033 and 5043 and are synchronized on the basis of timing signals applied to the latches 5033 and 5043 from an interpolation control circuit 5093. The two line data are transferred from the latches 5033 and 5043 to the interpolation section 5013, and are subjected therein to enlargement interpolation by one line. Output image data from the interpolation section 5013 are transferred to the interpolation section 5023 via the latches 5053 and 5063. Specifically, interpolation data corresponding to one line are held by the latch 5053 and are then transferred to the latch 5063. The data held by and the data transfer from the latches 5053 and 5063 are performed at timings determined by timing signals applied to the latches 5053 and 5063 from the interpolation control circuit 5093. The image data are transferred from the latches 5053 and 5063 to the interpolation section 5023. The interpolation section 5023 receives the picture element data $g_n$ from the latch 5063 and receives the adjacent picture element data $g_{n+1}$ from the latch 5053, performing enlargement interpolation defined by the previously-mentioned equations (11) and (12).

DESCRIPTION OF THE EIGHTH PREFERRED EMBODIMENT

Figure 21:
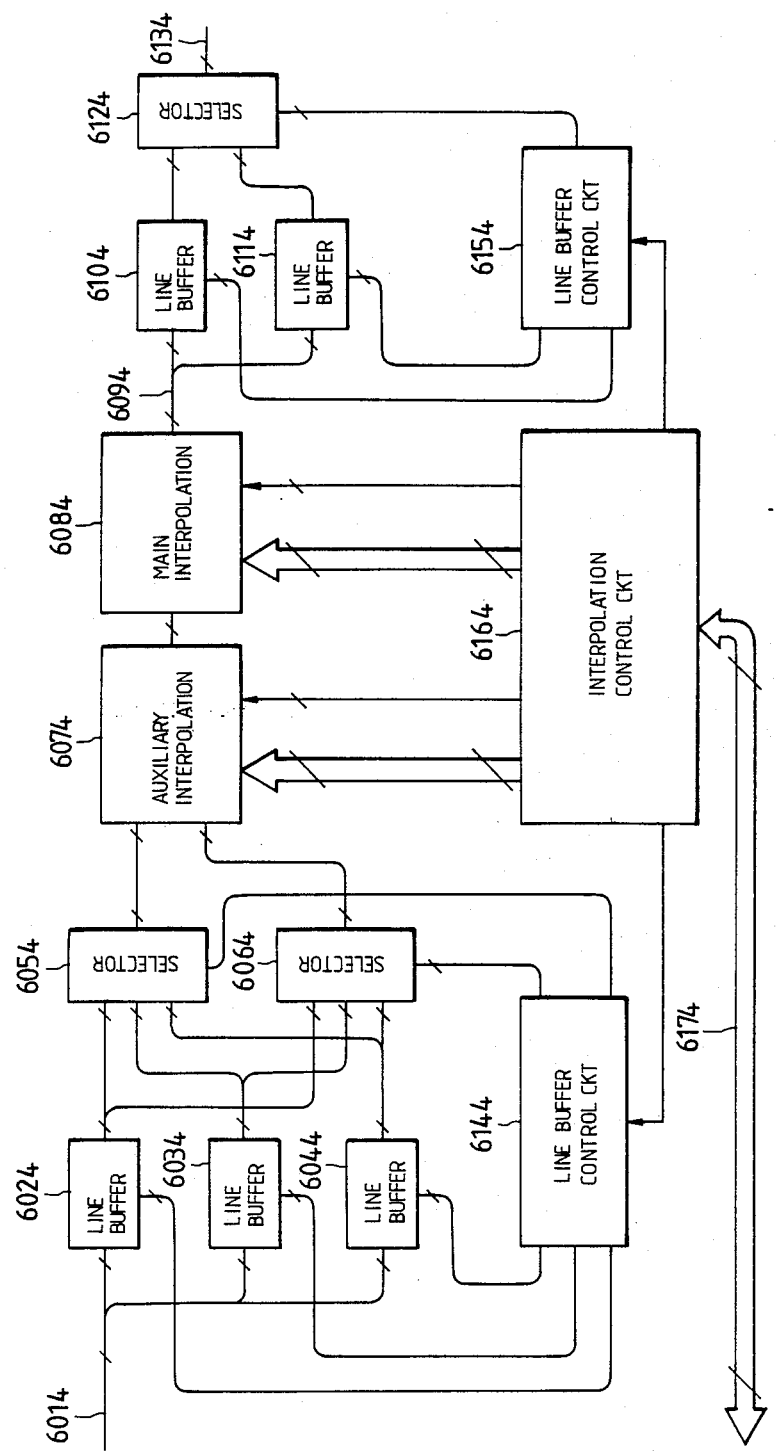
FIG. 21 is a block diagram of an image processing apparatus according to an eighth embodiment of this invention.

FIG. 21 shows an eighth embodiment of this invention which is similar to the embodiment of FIG. 20 except for design changes indicated hereinafter.

As shown in FIG. 21, image data are sequentially written into line buffer memories 6024, 6034, and 6044 via an input line 6014. At an initial stage, image data corresponding to two lines are sequentially written into the line buffer memories 6024 and 6034. During a subsequent stage, each time a periodical data process is completed, the image data are written into the remaining line buffer memory. The image data are read out from the two of the line buffer memories 6024-6044, and line data and adjacent line data are selected by selectors 6054 and 6064 respectively. The selected line data are inputted, into an auxiliary scan line data interpolation section 6074. An output data from the auxiliary interpolation section 6074 are inputted into a main scan picture element data interpolation section 6084. The line data are thus subjected to enlargement/reduction interpolation processes by the auxiliary and main interpolation sections 6074 and 6084. Processed line data outputted from the main interpolation section 6084 are alternately written into line buffer memories 6104 and 6114. One of the line buffer memories 6104 and 6114 which is free from the data write process is allowed by a selector 6124 to supply final interpolated image data to an output line 6134.

An input line buffer control circuit 6144 generates signals for controlling the line buffer memories 6024-6044 and the selectors 6054 and 6064. An output line buffer control circuit 6154 generates signals for controlling the line buffer memories 6104 and 6114 and the selector 6124. An interpolation control circuit 6164 receives interpolation data from a suitable device such as a microcomputer via an input line 6174, and transferring the interpolation data to the interpolation circuits 6074 and 6084 and controlling the interpolation circuits 6074 and 6084.

Figure 22:
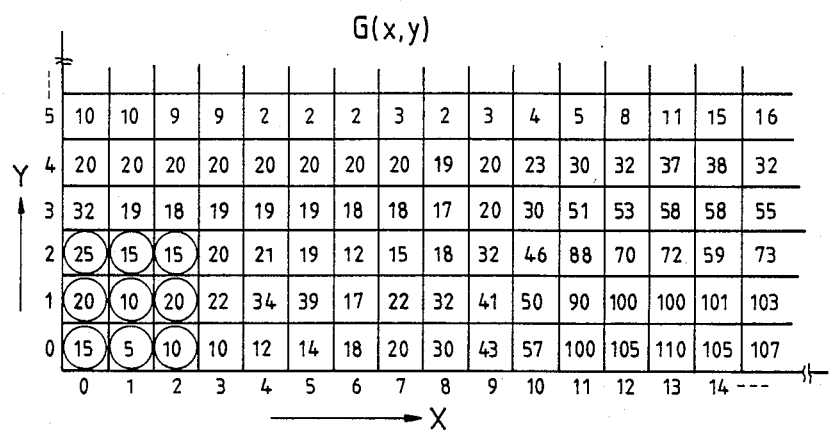
FIG. 22 is a diagram of original input image data in the apparatus of FIG. 21.
Figure 23:
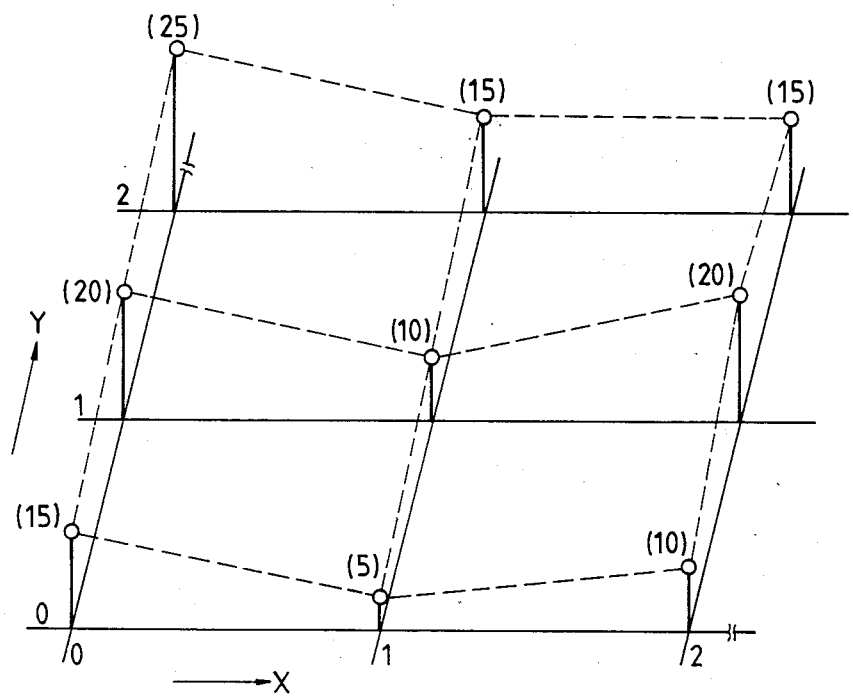
FIG. 23 is a diagram of part of the original input image data of FIG. 22.
Figure 24:
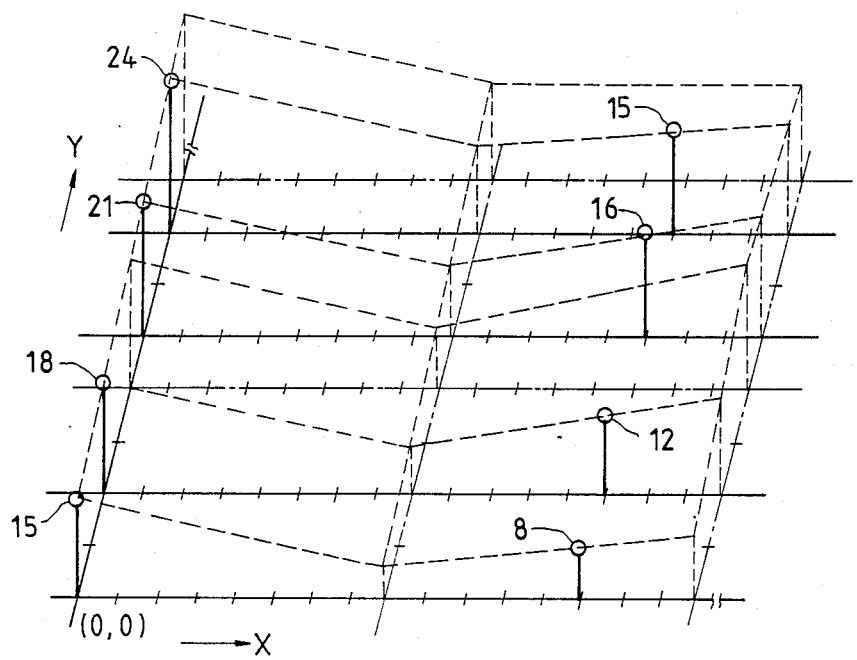
FIGS. 24 and 25 are different types of diagrams of image data obtained through an interpolation process in the apparatus of FIG. 21.
Figure 25:
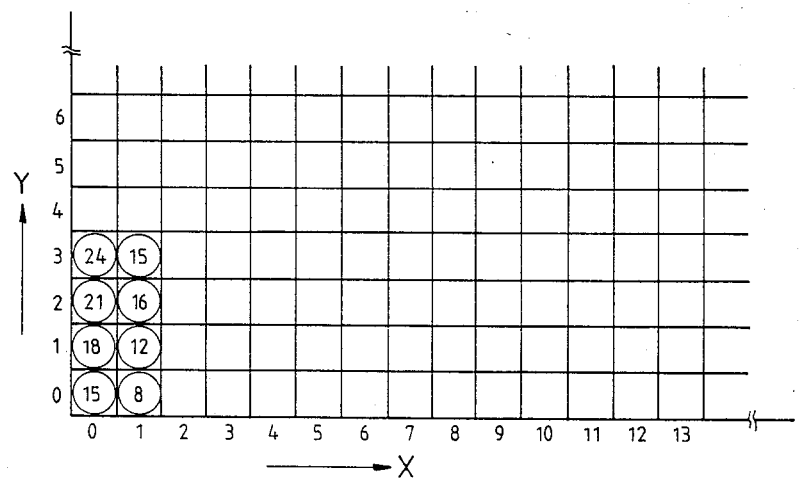

As shown in FIG. 22, the input picture element data are arranged in a two dimensional format. FIG. 23 shows the tone levels of picture element data enclosed with circles in FIG. 22. The original picture element data of FIGS. 22 and 23 are converted into processed picture element data of FIGS. 24 and 25 through an interpolation process where reduction interpolation with a division number of 8 and a reduction rate of 3/5 is performed in the main scan, that is, in the X direction and where enlargement interpolation with a division number of 4 and a reduction rate of 5/3 is performed in the auxiliary scan, that is, in the Y direction.

DESCRIPTION OF THE NINTH PREFERRED EMBODIMENT

Figure 26:
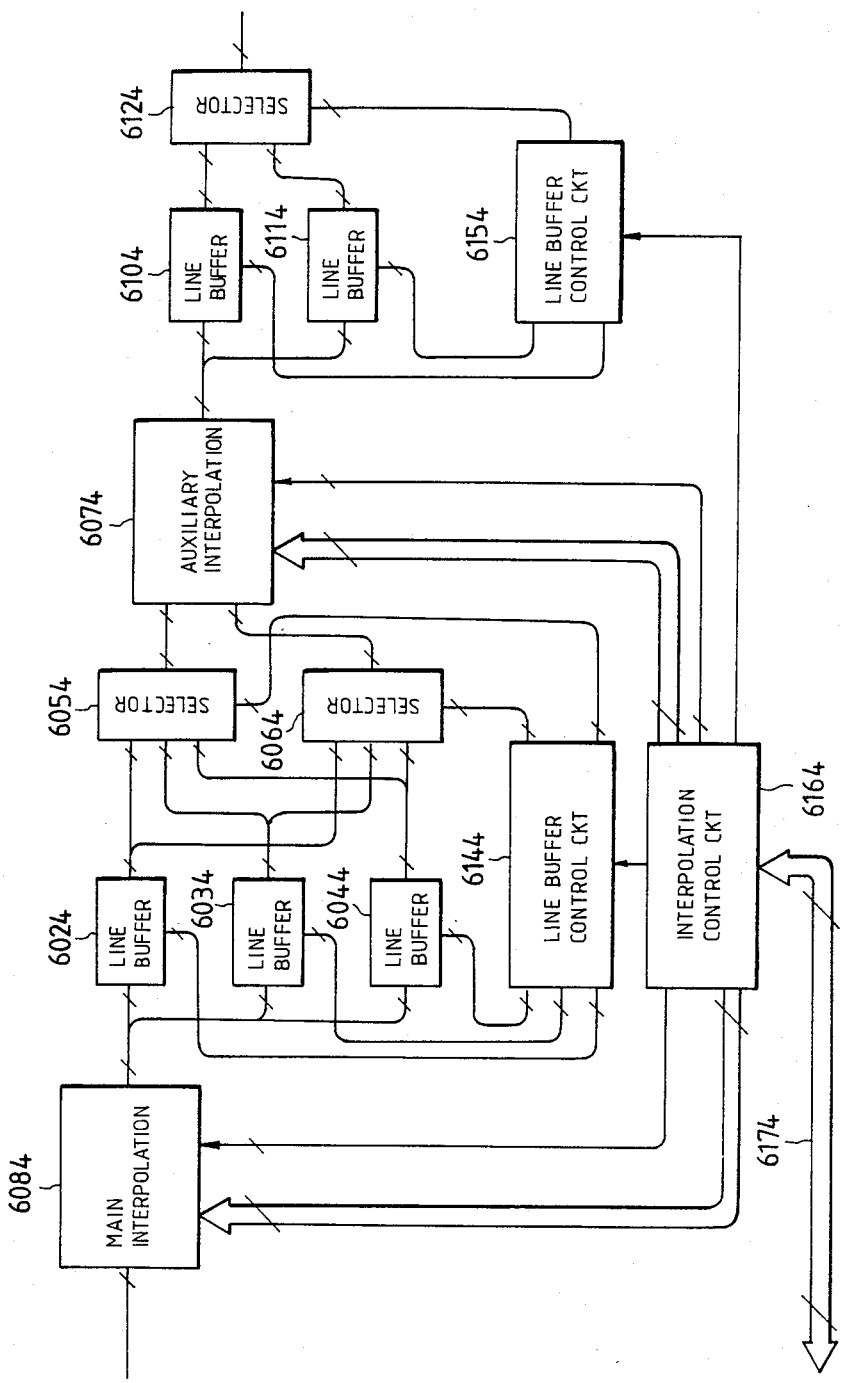
FIG. 26 is a block diagram of an image processing apparatus according to a ninth embodiment of this invention.

FIG. 26 shows a ninth embodiment of this invention which is similar to the embodiment of FIG. 21 except that the main interpolation section 6084 is placed at the front end.

What is claimed is:

1. In a method for changing a size of an image wherein new data are added between original picture element data through an interpolation process to change the size of the original image by a factor of B/α where the characters B and α denote integers, the improvement comprising a method of processing the image, including the steps of:
   (a) equally dividing an interval between adjacent picture elements of an original image into G image portions, wherein G is an integer;
   (b) setting points corresponding to the respective divided image interval portions;
   (c) determining interpolation data at points which vary as a function of adjacent picture elements of the original image;
   (d) selecting part of the interpolation data at a rate equal to B/(α·G), and
   (e) deriving output data h through said interpolation process in accordance with the following equation:

$$h = gn + ((gn+1 - gn)/G) \cdot i$$

where i denotes a number for selection of the points, which number i is determined in accordance with a rate equal to B/(α·G).

2. The method of claim 1 further comprising the steps of changing the size of the original image in a horizontal direction, and changing the size of the original image in a vertical direction independent of the size change in the horizontal direction.

3. The method of claim 1, wherein said method for processing the image comprises the further steps of:
   (a) generating a screen dot pattern in accordance with a prescribed screen cord number and a prescribed screen dot angle;
   (b) holding the screen dot pattern in a first memory;
   (c) generating a recurrent screen dot pattern on the basis of the screen dot pattern held by the first memory;
   (d) storing the recurrent screen dot pattern in an area of a prescribed size of a second memory;
   (e) generating an address for data write into, and data readout from, the second memory in a first address generator;
   (f) temporarily holding an input variable tone image in a line buffer circuit;
   (g) generating an address for data write into, and data readout from, the line buffer circuit in a second address generator; and
   (h) comparing image data outputted from the line buffer circuit and screen dot pattern data outputted from the second memory in a comparator.

4. In an image processing apparatus including size changing means for changing a size of an image wherein new data are added between original picture element data, said size changing means including interpolating means for changing the size of the original image by a factor of B/α where the characters B and α denote integers,
   the improvement wherein said interpolating means determines interpolation data at points which vary as a function of adjacent picture elements of the original image;
   said image processing apparatus comprises processing means, said processing means including:
   (a) dividing means for equally dividing an interval between adjacent picture elements of an original image into G image portions, wherein G is an integer; and
   (b) setting means for setting points corresponding to the respective divided image portions;
   and further including selecting means for selecting part of the interpolation data at a rate equal to B/(α·G),
   said interpolating means further including deriving means for deriving output data h in accordance with the following equation:

$$h = gn + ((gn+1 - gn)/G) \cdot i$$

where i denotes a number for selection of the points which is determined in accordance with a rate equal to B/(α·G).

5. An improved image processing apparatus in accordance with claim 4, wherein said size changing means further comprises horizontal changing means for changing the size of the original image in a horizontal direction and vertical changing means for changing the size of the original image in a vertical direction independent of the size change in the horizontal direction.

6. An improved image processing apparatus in accordance with claim 4, wherein said processing means comprises:
   (a) a first memory holding a screen dot pattern generated in accordance with a prescribed screen cord number and a prescribed screen dot angle;
   (b) means for generating a recurrent screen dot pattern on the basis of the screen dot pattern held by the first memory, the recurrent screen dot pattern residing in an area of a prescribed size;
   (c) a second memory holding the recurrent screen dot pattern;
   (d) a first address generator generating an address for data write into and data readout from the second memory;
   (e) a line buffer circuit temporarily holding an input variable tone image;
   (f) a second address generator generating an address for data write into and data readout from the line buffer circuit; and
   (g) a comparator comparing image data and screen dot pattern data, the image data being outputted from the line buffer circuit, the screen dot pattern data being outputted from the second memory.

7. The apparatus of claim 4 wherein the interpolating means is operative to calculate each of the interpolation picture element data from the values of four adjacent picture elements of the original image.

8. The apparatus of claim 6 wherein the screen dot pattern held by the first memory has screen dots represented by an arrangement of picture element data with tone levels, the screen dot angle equals $\tan^{-1}(b/a)$ where the character "a" denotes a horizontal distance between adjacent screen dots and the character "b" denotes a vertical distance between the adjacent screen dots, the screen cord number equals k/d where the character "k" denotes a recording density of a recording device and the character "d" denotes a pitch equal to a square root of $a^2+b^2$, and vertical and horizontal sizes of the screen dot pattern arrangement are equal to or greater than $d^2$.

9. The apparatus of claim 6 wherein the recurrent screen dot pattern is derived by reading out a portion of the screen dot pattern from the first memory, and the pattern portion has vertical and horizontal sizes equal to $d^2$, and further comprising means for repeatedly reading out the recurrent screen dot pattern from the second memory and thereby generating a large screen dot pattern on the basis of the recurrent screen dot pattern, the large screen dot pattern being used in the comparator as the screen dot pattern data.

* * * * *